United States Patent
Bois

Patent Number: 5,400,700
Date of Patent: Mar. 28, 1995

[54] ELECTRICAL COOKING APPARATUS AND ITS METHOD OF MANUFACTURE

[76] Inventor: Bernard M. Bois, 58, rue Pierre de-Coubertin, La Folie Couvrochef, Caen, France, F-14000

[21] Appl. No.: 182,088
[22] PCT Filed: Jul. 20, 1992
[86] PCT No.: PCT/FR92/00706
§ 371 Date: Jan. 13, 1994
§ 102(e) Date: Jan. 13, 1994
[87] PCT Pub. No.: WO93/02609
PCT Pub. Date: Feb. 18, 1993

[30] Foreign Application Priority Data
Jul. 30, 1991 [FR] France .................. 91 09672

[51] Int. Cl.$^6$ .......... A47J 27/00; A47J 37/12
[52] U.S. Cl. ................. 99/403; 99/410; 219/436; 219/438
[58] Field of Search ............ 99/403, 410–412, 99/413–418; 126/381; 219/429, 436, 438, 439, 441, 442, 430, 433, 462, 530

[56] References Cited

U.S. PATENT DOCUMENTS

| | | |
|---|---|---|
| 2,597,695 | 5/1952 | Braski et al. .................. 99/411 |
| 2,753,436 | 7/1956 | Schwaneke .................... 99/403 |
| 2,863,037 | 12/1958 | Johnstone ..................... 219/436 |
| 3,115,981 | 12/1963 | Darmstadt et al. . |
| 3,193,126 | 7/1965 | Bramming . |
| 3,463,077 | 8/1969 | Lescure ........................ 99/403 |
| 3,635,147 | 1/1972 | Lee . |
| 3,725,641 | 4/1973 | Tilp ............................... 219/433 |
| 3,801,331 | 4/1974 | Sano et al. .................... 99/403 |
| 4,138,606 | 2/1979 | Brown .......................... 219/438 |
| 4,148,250 | 4/1979 | Miki et al. .................... 99/403 |
| 4,995,312 | 2/1991 | Leiros .......................... 99/411 |
| 5,029,519 | 7/1991 | Boyen .......................... 99/403 |
| 5,092,229 | 3/1992 | Chen ............................ 99/413 |

FOREIGN PATENT DOCUMENTS

| | | |
|---|---|---|
| 0295159 | 12/1988 | European Pat. Off. . |
| 532716 | 2/1922 | France . |
| 1125020 | 10/1956 | France . |
| 175869 | 10/1906 | Germany . |

Primary Examiner—Timothy F. Simone
Attorney, Agent, or Firm—Young & Thompson

[57] ABSTRACT

A cooking apparatus, comprising a casing (3) produced from a plastic material capable of degrading at a high temperature and which surrounds, leaving a certain space, a metal pan (1), the pan resting on a series of supports (5-20-33) made from a heat-resistant material which are interposed between the upper edges of the casing (3) and the pan (1), and which thus leave between them spaces for the circulation of air (7). The supports (5-20-33) each comprise a head (9-25-36) which is securely mounted on the upper edge (4) of the pan (1) and a body (10-23-34) intended to come into engagement with the upper edge (6) of the casing (3) and comprising a fixing member (11-31-39) with the edge of the casing. The cooking apparatus is particularly useful as a deep fryer.

10 Claims, 3 Drawing Sheets

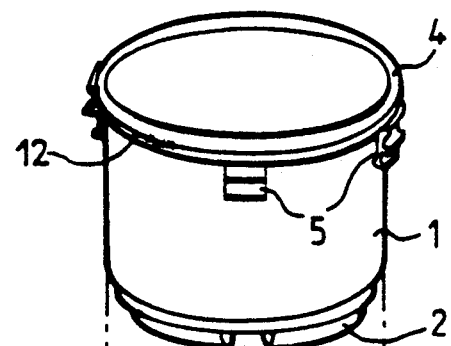
FIG_1
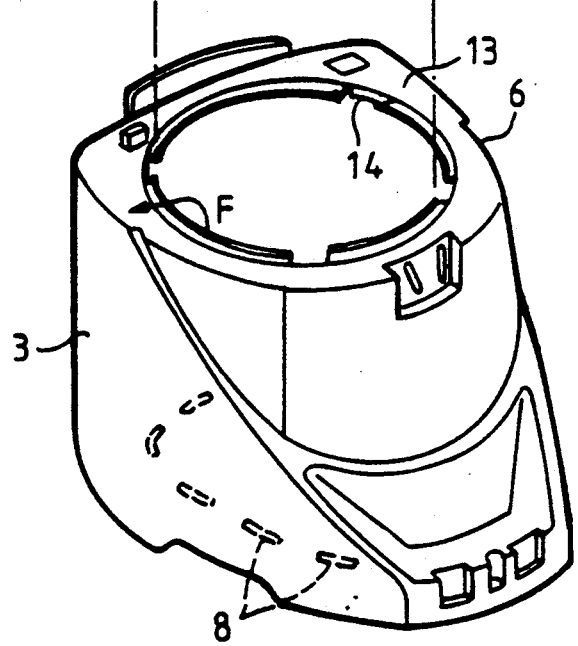
FIG_2
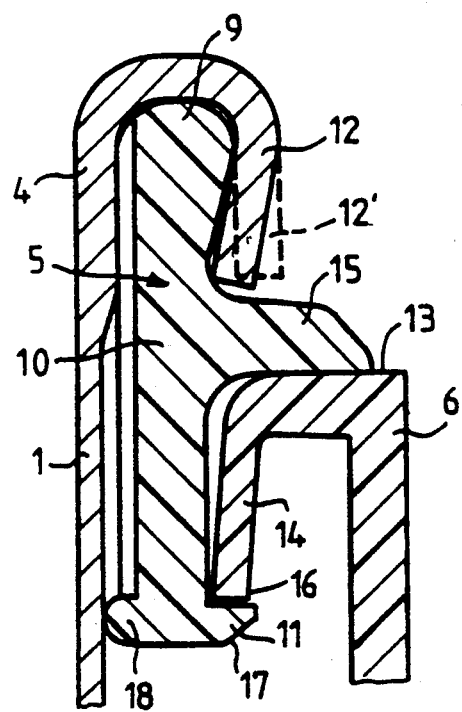
FIG_3
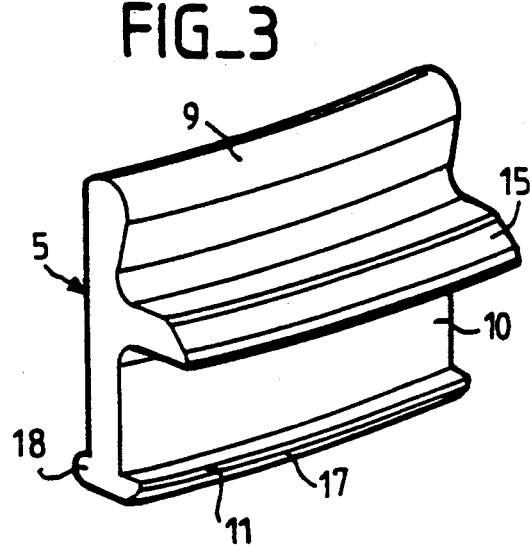

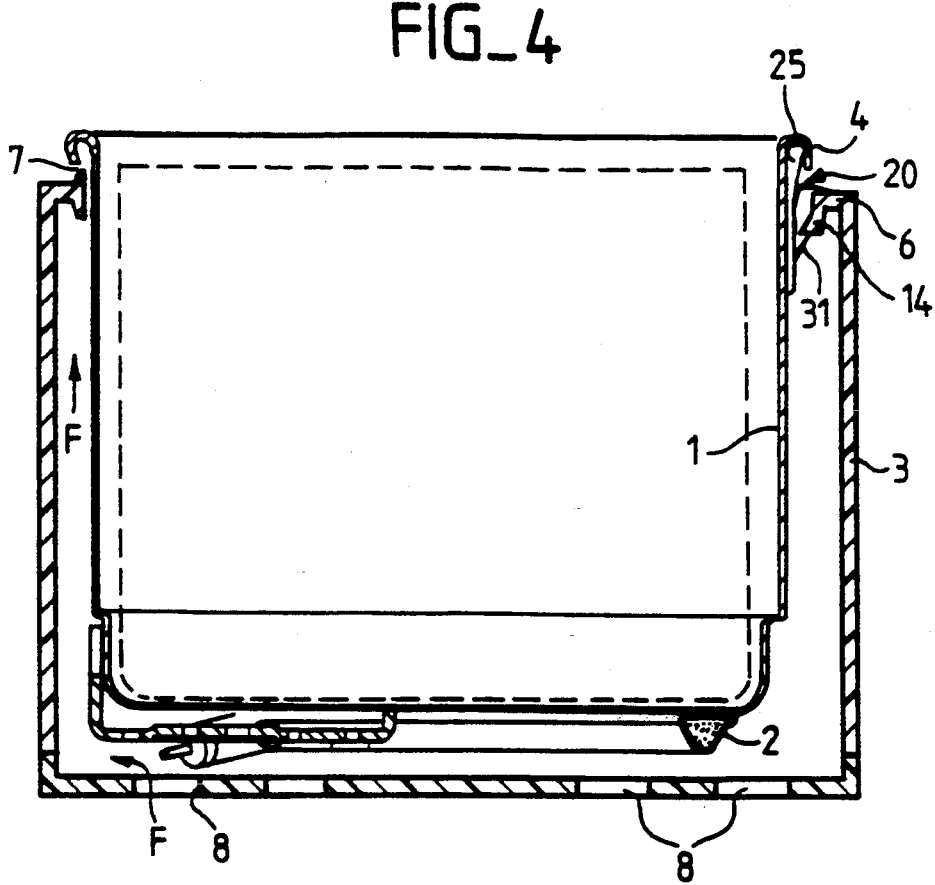
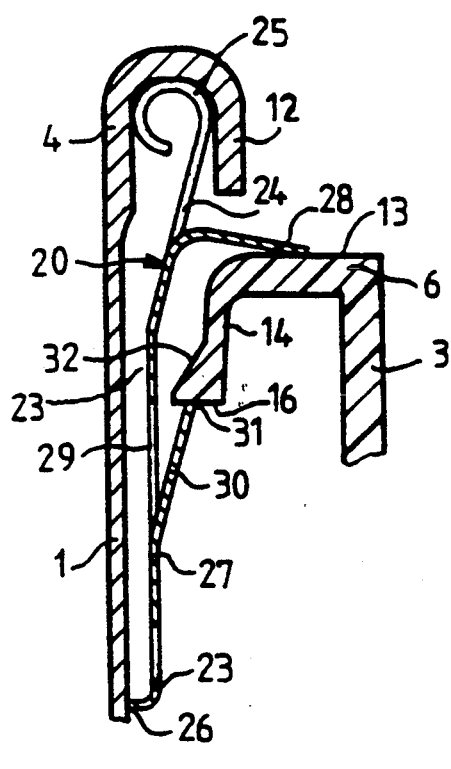
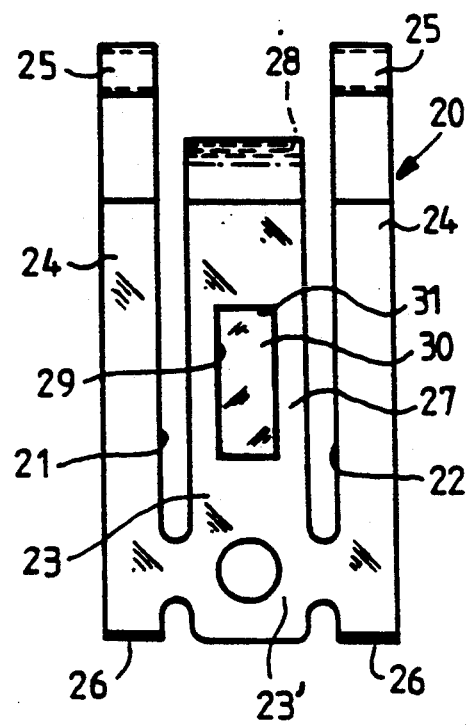

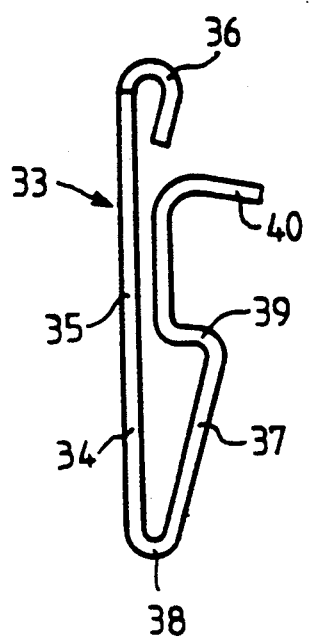
FIG_7
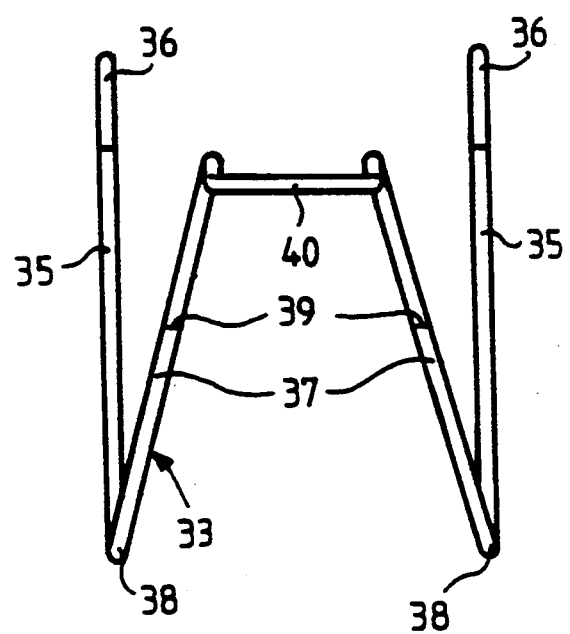
FIG_8

ELECTRICAL COOKING APPARATUS AND ITS METHOD OF MANUFACTURE

BACKGROUND OF THE INVENTION

The invention relates to electrical cooking apparatuses, such as for example deep fryer, comprising a casing produced from a plastic material capable of degrading at a high temperature and which surrounds, leaving a certain space, a metal pan heated by a heating means, the said pan resting on a series of supports made from a heat-resistant material which are interposed between the upper edge of the casing and the upper edge of the pan, and which thus leave between them spaces between the said upper edges of the pan and of the casing in such a manner as to allow the circulation of air around the pan between openings made in the lower portion of the casing and the said spaces.

In known apparatuses of this type, where air circulation is maintained between the pan and the casing, it is necessary, during manufacture, to perform operations for indexing and for mounting the supports on the casing, centering the pan with respect to the supports, then fitting in and generally fixing the latter in the casing. These various operations are not suited to automated manufacture in full-scale production.

SUMMARY OF THE INVENTION

The object of the invention is especially to simplify the construction of such a cooking apparatus.

According to the invention, the said supports each comprise a head which is securely mounted on the upper edge of the pan and a body intended to come into engagement with the upper edge of the casing and comprising a fixing member with the said edge of the casing.

Thus, since the supports, are fixed directly onto the edge of the pan, it is possible to simplify the subsequent operations of fitting and fixing the pan in the casing, which makes it possible to have entirely automated manufacture in full-scale production.

Other advantageous characteristics are defined in the appended claims.

BRIEF DESCRIPTION OF THE DRAWINGS

The characteristics and advantages of the invention will emerge, moreover, from the description which follows by way of an example with reference to the appended drawings in which:

FIG. 1 represents, in perspective, a cooking apparatus, such as a deep fryer, before assembling the pan in the casing according to a first embodiment, and to which the invention is applied;

FIG. 2 is a partial vertical transverse section, on a large scale, illustrating a portion of the assembly of the pan in the casing by means of a support in accordance with a first embodiment;

FIG. 3 represents, in perspective, the support of FIG. 2;

FIG. 4 represents diagrammatically in vertical section a deep fryer equipped with a support according to a second embodiment;

FIG. 5 is a blown-up view of a portion of FIG. 4 illustrating the upper edges of the pan and of the casing equipped with a support;

FIG. 6 is a view on a smaller scale in elevation of the support of FIG. 5;

FIG. 7 is a profiled view of a support according to a third embodiment;

FIG. 8 is a front elevation view of the support of FIG. 7.

DETAILED DESCRIPTION OF THE INVENTION

The electrical cooking apparatus represented in FIG. 1 is deep fryer which comprises a metal pan 1 the bottom of which is heated by heating means 2 such as a shielded electrical resistance, a casing 3 produced in a plastic material capable of degrading at a high temperature such as, for example, that detected on the upper edge 4 of the pan 1 which is of the order of 180° C. Such plastic materials are known, for example, under the name of A.B.S or polypropylene. In order to avoid degradation of the upper edge 6 of the casing 3, the said pan 1 rests inside the casing 3 on a series of supports 5 which are interposed in the said upper edge 6 and the upper edge 4 of the pan, and which thus leave between them spaces 7 (see FIG. 4) between the said upper edges in such a manner as to allow the circulation of air (arrows F FIGS. 1 and 4) around the pan between the said spaces and openings 8 made in the lower portion of the casing.

This circulation of air especially makes it possible to obtain not only a good ventilation of the space guaranteeing a more accurate operation of the thermostat which is generally fixed on the bottom of the pan and thus avoiding stagnation of drops of oil which get into this space between the supports and thus the emission of a burnt smell, but also, a better distribution of the temperature of the pan which is heated via its bottom and thus better homogenisation of the temperature of the oil bath.

According to the invention, the said supports 5 each comprise a head 9 which is securely mounted on the upper edge 4 of the pan 1 and a body 10 intended to come into engagement with the upper edge 6 of the casing and comprising a member 11 for fixing to the said edge 6.

As is better seen in FIG. 2, the upper edge 4 of the pan 1 has a rim 12 bent outwards and downwards and defining a housing for the heads 9 of the supports 5, and the upper edge 6 of the casing has a horizontal edging 13 directed towards the inside and followed by a descending rim 14 the lower end 16 of which forms a catch.

According to a first embodiment illustrated in FIGS. 1, 2 and 3, the supports 5 are four in number and each is formed from a moulded material such as a plastic material which can withstand over time the temperature of the upper edge 4 of the pan, such as for example, of the polyamide or polyester type. Each support 5 has a cross-section in the general shape of a "t" the upper end of the vertical branch of which forms the head 9, and the lower end of which carries the fixing member 11 which is shaped as a hook directed towards the internal wall of the casing 3, whilst the horizontal branch 15 of the "t" constitutes a bearing means intended to come into engagement on the edging 13 of the casing.

In the example represented, the heads 9 of the supports 5 are crimped in the housing of the edge of the pan. This crimping operation is illustrated diagrammatically in FIG. 2 in which the rim 12 before bending is represented in broken lines 12' and the bent rim after crimping is represented in solid lines.

Referring to FIG. 1, it is understood that in order to manufacture a deep fryer according to the invention, a first operation consisting in mounting the supports 5 on the edge of the pan 4 is performed by placing the heads 9 in the housing of the edge of the pan (position in broken lines 12'), then a second operation consisting in crimping the heads 9 in this housing (edge of the pan 12 position in solid lines), and finally a third operation in which the pan-supports assembly thus formed is introduced from above into the opening of the casing 3 until the bearing means 15 come to rest on the edging 13 and until the hooks 11 elastically lock onto the lower end 16 of the rim 14. In order to facilitate automatic locking, each hook 11 has a chamfered part 17 as well as a heel 18 which comes to bear against the wall of the pan 1.

In this embodiment, the elastic locking is obtained by elastic deformation of the rim 14 of the casing 3, but it could, of course, be obtained, for example, by elasticity in the catch 11, especially by eliminating the heel 18.

According to another embodiment, the supports 5 can be replaced by metal supports which can withstand the temperature of the edge of the pan, for example produced from stainless steel and of a different shape. Each metal support thus has the shape of an oblong plate comprising, at one end, for example, at least one rolled edge forming a head, and in the body, a strip forming a bearing means as well as a clip situated under the strip and the free end of which forms a hook.

In an example of this other embodiment represented by way of a non limiting example in FIGS. 4, 5 and 6 and in which the portions of the deep fryer which are common to both embodiments have the same references as those in FIGS. 1 and 2, the oblong plate forming a support 20 has two longitudinal notches 21 and 22 thus making a body 23 of three strips joined together at a common base 23', namely two external strips 24 the free ends 25 of which have respectively a rolled edge forming a head, and the lower ends of which respectively form a heel 26, as well as a central strip 27 the free end 28 of which is bent and forms the bearing means, and the central region of which has a partial cut-out 29 forming a clip 30 bent out of the plane of the said strip 27 and the free end 31 of which forms a fixing member in the shape of a hook.

By virtue of this configuration, a fairly long path between the edge of the pan 4 and the edge of the casing 3 is obtained: heads 25, strips 24, common portion 23, strip 27, bearing means 28, in such a manner as to favour the dissipation of heat from each support inserted in the air space.

As is better seen in FIG. 5, the heads 25 of each support 20 are crimped in the housing of the upper edge 4 of the pan 1 and the heels 26 bear upon the external wall of the pan 1.

Thus, in order to produce a deep fryer according to FIG. 4 the procedure is the same as that described for FIGS. 1 and 2, that is to say that once the pan 1 is equipped with its supports 20, this pan support assembly is fitted into the casing 3 until the bearing means 28 come to rest on the edging 13 of the casing and until elastic locking of the hooks 31 onto the lower edge 16 of the rim 14 is obtained. To this end, the lower end 16 of the rim 14 has a boss 32 turned towards the pan and favouring the elastic deformation of the hooks 31 in such a manner as to obtain, by relaxation, their automatic locking onto the said lower end 16.

According to a third embodiment illustrated in FIGS. 7 and 8, the supports 5 are replaced by supports 33 produced from metal wire, for example, stainless steel wire and has in a front view (FIG. 8), a body 34 of general "W" shape the two external sections 35 of which comprise respectively two free ends 36 shaped into a loop in such a manner as to form heads, and the internal sections 37 of which, linked respectively by an elbow 38 to the two sections 35, each have a bend 39 forming the fixing member in the shape of a hook, whilst the upper median portion of the two sections 37 is formed into a band 40 extending transversally to the sections 35 and 37 and constituting a bearing means 40.

These supports 33 are mounted in the same manner as in the embodiment according especially to the second embodiment.

Thus, by virtue of the invention, the manufacture of a deep fryer equipped with such supports (5-20-33) is particularly easy, well adapted to automated manufacture in full-scale production and particularly economical. The invention can be applied to other cooking apparatuses such as for example: rice cookers, electric pans, slow cookers, etc. . .

Moreover, it will be noted that, by virtue of fixing the heads in the upper edge of the pan combined with the fixing members (bearing means and hook) on the upper edge of the casing, the pan 1 is freely mounted with respect to the casing 3 and does not require another fixing member in order to maintain it in this casing, which lowers the manufacturing cost.

This arrangement also makes it possible to simplify repair operations if required.

I claim:

1. Electrical cooking apparatus comprising a casing produced from a plastic material capable of degrading at a high temperature, a metal pan surrounded by said casing and defining a space therebetween, heating means for heating said pan, a series of supports made from a heat resistant material for supporting said pan, said supports being interposed between an upper edge of the casing and an upper edge of the pan so as to leave spaces between the upper edges of the pan and of the casing, a plurality of openings located in a lower portion of the casing so as to allow circulation of air around the pan between the openings and the spaces, each of said supports comprising a head securely mounted on the upper edge of the pan and a body intended to come into engagement with the upper edge of the casing, and secured to the edge of the casing by a fixing member.

2. Electrical cooking apparatus according to claim 1, wherein the upper edge of the pan has a rim bent outwards and downwards and defines a housing in which the heads of the supports are crimped.

3. Electrical cooking apparatus according to claim 1, wherein each fixing member is formed by a hook intended to come into engagement with a corresponding catch secured on the upper edge of the casing.

4. Electrical cooking apparatus according to claim 3, wherein the upper edge of the casing has a horizontal edging directed towards the inside and a descending rim depending therefrom, said rim having an end which forms the catch.

5. Electrical cooking apparatus according to claim 3, wherein each support is formed from a molded material which can withstand the temperature of the upper edge of the pan and has a cross-section in the general shape of a "t" having a vertical branch and a horizontal branch, an upper end of the vertical branch forming the head, and a lower end of the vertical branch carrying the fixing member in the shape of a hook directed towards an internal wall of the casing, and the horizontal branch forming a bearing means.

6. Electrical cooking apparatus according to claim 5, wherein each support is made from a plastic material.

7. Electrical cooking apparatus according to claim 3, wherein each support is made from a metal which can withstand the temperature of the edge of the pan and has the shape of an oblong plate comprising, at one end, a rolled edge forming said head, and in the body a strip forming a bearing means, and a clip situated under the strip, said clip having a free end which forms said hook.

8. Electrical cooking apparatus according to claim 7, wherein the oblong plate is made of stainless steel and has in the body two longitudinal notches making three strips, two external strips and a central strip, each of the external strips having a free end which terminates as a rolled edge forming said head, said central strip having a free end which is bent and forms the bearing means, said central strip further including a central region with a partial cutout portion bent out of the plane of the central strip, and which forms said clip, said clip having a free end which forms said hook.

9. Electrical cooking apparatus according to claim 3, wherein each support is made of metal wire and has in a front view, a body in the general shape of a "W" with two external sections and two internal sections, each of said external section comprising a free end shaped into a loop which forms the head and said internal sections being linked by an elbow to the two external sections, each internal section having a bend forming a hook, while an upper median portion of the two internal sections is formed into a loop which extends transversely to the internal and external sections, and constitutes a bearing means.

10. Method for mounting a pan in a casing of an electrical cooking apparatus according to claim 3, which comprises:
  crimping the heads of the supports in the housing of the upper edge of the pan; and
  fitting the pan equipped with the heads into the casing until the bodies come to bear on the upper edge of the casing, and until the hooks elastically clip onto the catch secured to the upper edge.

* * * * *